US011071052B2

(12) United States Patent
Zaus et al.

(10) Patent No.: US 11,071,052 B2
(45) Date of Patent: Jul. 20, 2021

(54) METHOD FOR THE TRANSFER OF RADIO CAPABILITY INFORMATION

(71) Applicant: Intel Corporation, Santa Clara, CA (US)

(72) Inventors: Robert Zaus, Munich (DE); Sabine Roessel, Munich (DE); Bernhard Raaf, Neuried (DE); Jan Ellenbeck, Gruenwald (DE); Hyung-Nam Choi, Hamburg (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/851,641

(22) Filed: Apr. 17, 2020

(65) Prior Publication Data

US 2020/0288388 A1 Sep. 10, 2020

Related U.S. Application Data

(63) Continuation of application No. 16/460,142, filed on Jul. 2, 2019, now Pat. No. 10,660,029, which is a
(Continued)

(51) Int. Cl.
*H04W 8/20* (2009.01)
*H04W 48/16* (2009.01)
(Continued)

(52) U.S. Cl.
CPC .............. *H04W 48/16* (2013.01); *H04W 8/20* (2013.01); *H04W 8/22* (2013.01); *H04W 48/14* (2013.01)

(58) Field of Classification Search
CPC ......... H04W 48/16; H04W 8/20; H04W 8/22; H04W 48/14; H04W 72/0406; H04W 72/0453
See application file for complete search history.

(56) References Cited

U.S. PATENT DOCUMENTS

2011/0319069 A1 12/2011 Li
2012/0135733 A1 5/2012 Cormier et al.
(Continued)

FOREIGN PATENT DOCUMENTS

EP 2373070 A1 10/2011
EP 3062545 A1 8/2016
(Continued)

OTHER PUBLICATIONS

Canada Intellectual Property Office; Office Action issued in Patent Application No. CA 2938744, dated Jun. 18, 2019; 6 pages.
(Continued)

*Primary Examiner* — Said M Elnoubi
(74) *Attorney, Agent, or Firm* — Alliance IP, LLC

(57) ABSTRACT

Technology for improving the selection, transfer, and storage of user equipment (UE) radio capability information is disclosed. A cellular mobile network can be configured to identify radio-access-technology (RAT)-specific radio-capability information relating to RATs supported in the cellular mobile network and communicate the RAT-specific radio-capability information to a UE. The UE can use the RAT-specific radio-capability information to help determine which UE radio capability information to send to the network. In addition, the UE may store a list of supported frequency bands and/or supported frequency-band combinations (LOSB) indexed by network operators and use the list to help determine which UE radio capability information to send to the network. A network node may also selectively remove unnecessary information from UE radio capability information before storing the UE radio capability information at a mobility management entity (MME).

20 Claims, 7 Drawing Sheets

Related U.S. Application Data continuation of application No. 14/582,996, filed on Dec. 24, 2014.

(60) Provisional application No. 61/952,750, filed on Mar. 13, 2014.

(51) Int. Cl.
*H04W 8/22* (2009.01)
*H04W 48/14* (2009.01)

(56) References Cited

U.S. PATENT DOCUMENTS

| | | |
|---|---|---|
| 2012/0178465 A1 | 7/2012 | Lin et al. |
| 2012/0184281 A1 | 7/2012 | Kim et al. |
| 2013/0308481 A1 | 11/2013 | Kazmi et al. |
| 2013/0322302 A1 | 12/2013 | Gholmieh et al. |
| 2014/0376393 A1 | 12/2014 | Shi et al. |
| 2015/0271806 A1 | 9/2015 | Kim et al. |
| 2016/0157140 A1 | 6/2016 | Tiwari et al. |

FOREIGN PATENT DOCUMENTS

| | | | |
|---|---|---|---|
| JP | H1041937 A | 2/1998 | |
| JP | 2012169852 A | 9/2012 | |
| JP | 2012204910 A | 10/2012 | |
| JP | 2014506744 A | 3/2014 | |
| JP | 2015516774 A | 6/2015 | |
| RU | 2470486 C1 | 12/2012 | |
| WO | 2008155290 A1 | 12/2008 | |
| WO | WO-2008155290 A1 * | 12/2008 | ............ H04W 48/16 |
| WO | 2010145938 A1 | 12/2010 | |
| WO | 2012099404 A3 | 12/2012 | |
| WO | 2013022310 A2 | 2/2013 | |
| WO | 2013126859 A2 | 8/2013 | |
| WO | 2013169061 A1 | 11/2013 | |
| WO | 2014022491 A1 | 2/2014 | |

OTHER PUBLICATIONS

Indian Patent Office; Office Action issued in Patent Application No. IN 201647025641, dated Oct. 23, 2019; 6 pages including English translation.

Japan Patent Office; Notice of Allowance issued in Patent Application No. JP 2016-549427, dated Aug. 22, 2017; 3 pages, English translation not available.

Taiwan Patent Office; Notice of Allowance issued in Patent Application No. TW 105128251, dated Apr. 26, 2017; 4 pages including partial English translation.

3GPP TS 23.122; "Technical Specification Group Core Network and Terminals; Non-Access-Stratum (Nas) Functions Related to Mobile Station (MS) in Idle Mode;" (Dec. 2013); V 12.3.0 (Release 12).

3GPP TS 23.401; "Technical Specification Group Services and System Aspects; General Packet Radio Service (CPRS) Enhancments for Evolved Universal Terrestrial Radio Access Network (E-UTRAN) Access;" (Mar. 2013); V 12.0.0 (Release 12).

3GPP TS 36.331; "3rct Generation Partnership Project; Technical Specification Group Radio Access Network; Evolved Universal Terrestrial Radio Access (E-UTRA); Radio Resource Control (RRC); Protocol Specification;" (Dec. 2013); 349 pages; VI 1.6.0 (Release 11).

3GPP TS 36.331; "Technical Specification Group Radio Access Network; Evolved Universal Terrestrial Radio Access (E-UTRA); Radio Resource Control (RRC); Protocol Specification;" (Dec. 2013); V 12.0.0 (Release 12).

Ericsson, ST-Ericsson; "Transfer of Large Size UE EUTRA Capabilities;" 3GPP Tdoc R2-130569; (Jan. 28-Feb. 1, 2013); 4 pages; TSG-RAN WG2 #81, St. Julian's, Malta; (Agenda 4.4).

Extended European search report for European Application No. 15760908.2, filed Feb. 12, 2015; dated Jul. 17, 2017; 21 pages.

NTT Docomo Inc.; "E-UTRA UE Capability Size Problem in UTRAN and E-UTRAN;" 3GPP R2-133492; (Oct. 7-11, 2013); 5 pages; TSG-RAN2 #83bis, Ljubljana, Slovenia; (Agenda 4).

NTT Docomo Inc.; "E-UTRA UE Capability Size Problem in UTRAN and E-UTRAN;" 3GPP R2-133602; (Oct. 7-11, 2013); 5 pages; TSG-RAN2 #83bis, Ljubljana, Slovenia; (Agenda 4).

Office Action dated Sep. 9, 2017; in Russian Patent Application No. 2016133386; filed Feb. 12, 2015; 8 pages.

PCT International Search Report and Written Opinion in PCT International application PCT/US2015/015620 dated May 19, 2015, 18 pages.

Brazil Patent Office; Office Action issued in BR Patent Application No. BR112016018340-1, dated Sep. 8, 2020; 5 pages with English translation.

* cited by examiner

METHOD FOR THE TRANSFER OF RADIO CAPABILITY INFORMATION

RELATED APPLICATIONS

This is application is a continuation of U.S. patent application Ser. No. 16/460,142 filed Jul. 2, 2019, which is a continuation of U.S. patent application Ser. No. 14/582,996 filed Dec. 24, 2014, which claims the benefit of U.S. Provisional Patent Application No. 61/952,750, filed Mar. 13, 2014, the entire specification of which is hereby incorporated by reference in its entirety for all purposes.

BACKGROUND

In mobile networks that conform to third generation partnership project (3GPP) standards, a user equipment (UE) device that aims to connect to a network is typically configured to provide the network with information relating to the UE's radio capabilities. The UE may, for example, indicate which frequency bands and frequency-band combinations for carrier aggregation (CA) the UE supports. The UE may also indicate for each supported band whether half-duplex or full duplex transmission is supported. The UE may also include other information relating to band combinations or specific modes, such as information relating to handover between different band/mode combinations and handover to other radio access technologies (RATs).

The evolved universal terrestrial radio access network (E-UTRAN) standard has been designed to be very flexible with regard to the frequency bands and bandwidth with which it can be deployed. Consequently, the number of frequency bands and frequency band combinations supported by a UE can be very high. Currently, there are around 40 single-frequency bands and about 140 frequency-band combinations for CA that have been standardized worldwide. Since the E-UTRAN is being deployed in wireless networks across the globe, it is likely that many more bands and band combinations will be standardized in the future. This poses a problem because mobility management entities (MME), which are a core network nodes in evolved packet core networks that are associated with the E-UTRAN, are currently configured to store only up to 510 octets of radio capability information about a UE that connects to the network. If a UE vendor targets to support world-wide roaming and the UE is expected to provide the UE's complete radio capability information, the amount of radio capability information the UE is configured to send can easily occupy more than the 510 octets of space that the MME has allotted for the UE's radio capability information. As a consequence, some of the radio capability information provided by the UE will not be taken into account by the network, and certain features may not work even if they are supported both by the UE and by the network.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
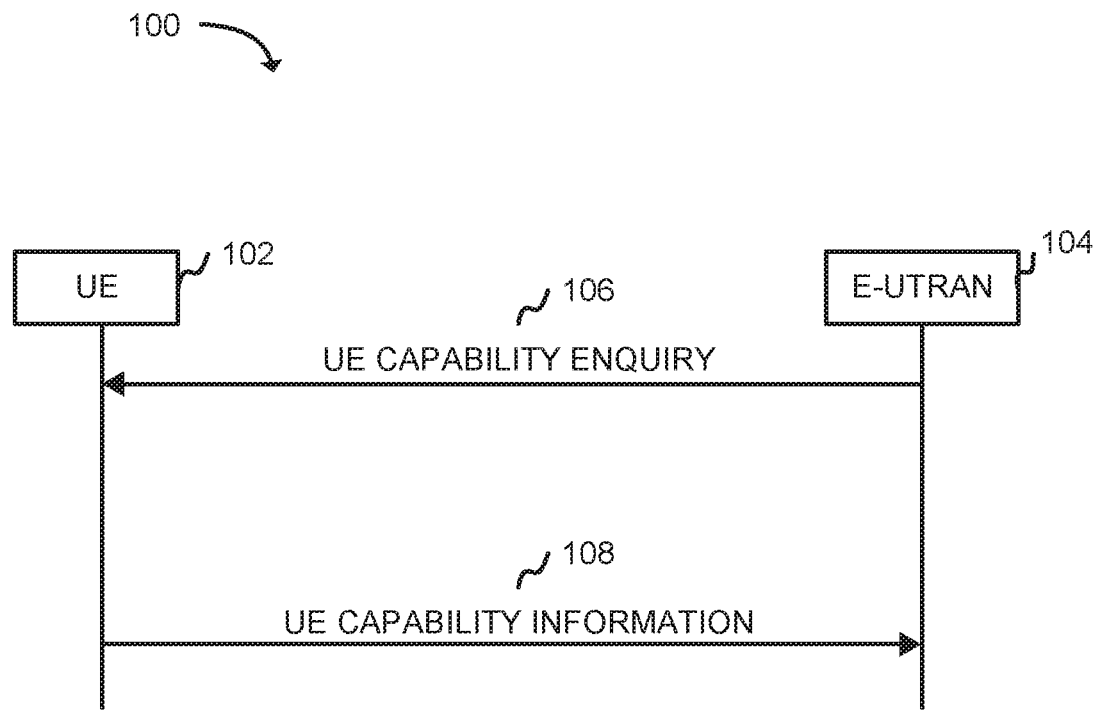
FIG. 1 illustrates the a UE-capability transfer procedure that is used to retrieve radio capability information from a UE in accordance with an example.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates the current UE-capability transfer procedure 100 that is used to retrieve radio capability information from a UE. In operation 106, the E-UTRAN 104 sends a UE capability enquiry to the UE 102. Radio capability information related to various radio access technologies (RATs) may be requested, such as information relating to E-UTRA, global system for mobile communications (GSM) enhanced data rates for GSM evolution (EDGE) radio access network (RAN) for circuit-switched (CS) domain (GERAN-CS), global system for mobile communications (GSM) enhanced data rates for GSM evolution (EDGE) radio access network (RAN) for packet-switched (PS) domain (GERAN-PS), UTRA, and code division multiple access one times radio transmission technology (cdma2000-1xRTT) network types. In operation 108, the UE responds by sending UE radio capability information to the E-UTRAN 104. Under the current 3 GPP standard, the UE is expected to provide all of its radio capability information related to a RAT for which information is requested.

Figure 2:
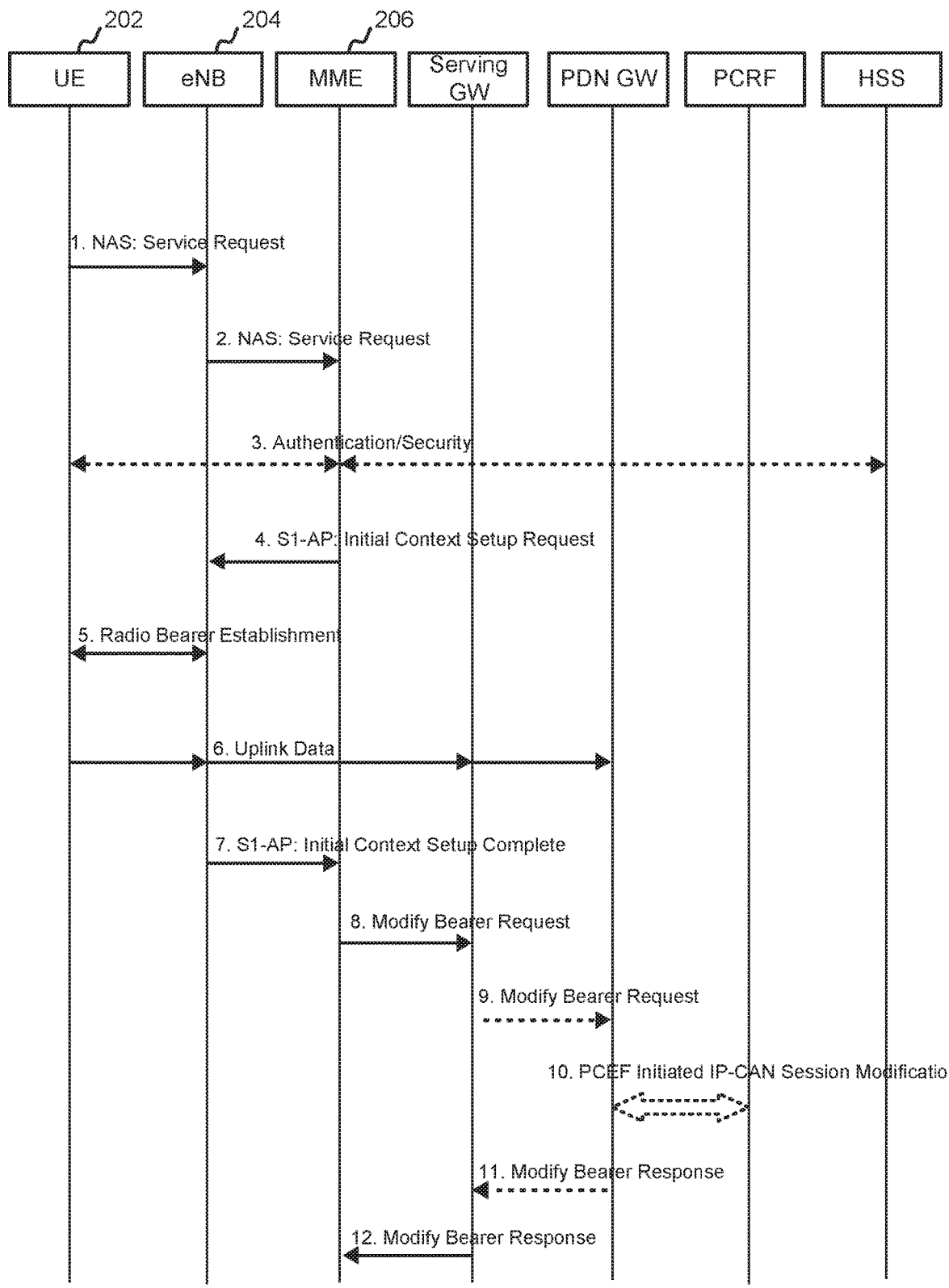
FIG. 2 illustrates a UE-triggered service request procedure in an E-UTRAN in accordance with an example.

FIG. 2 illustrates a UE-triggered service request procedure in an E-UTRAN. A UE 202 can request service from an eNB 204. The eNB 204 can keep radio capability information received about the UE 202 (e.g., through the procedure illustrated in FIG. 1) stored in the eNB's own memory as long as the UE 202 is connected to the eNB 204. The eNB 204 also sends the radio capability information to an MME 206 in an S1-AP message (e.g., UE Capability Info Indication); the MME 206 can be configured to continue to store the radio capability information about the UE 202 even after the UE's connection to the eNB 204 is released.

The next time the UE 202 initiates a service request procedure to establish a connection with the network, the MME 206 can provide the eNB 204 with the UE's radio capability information in an S1-AP message (Initial Context Setup Request) as shown in operation 4. This procedure obviates the need for the eNB 204 to retrieve radio capability information from the UE 202 every time the UE 202 requests service from the eNB.

There are several problems with the current approach that is used to request, provide, and store UE radio capability information. First, if the UE sends radio capability information indicating support for a certain frequency band or feature in any octet later than octet 510, this additional radio capability information may not be stored by the MME. As a result, the MME will not provide the additional radio capability information to the eNB when the UE subsequently requests service from the eNB (e.g., when the UE changes from an evolved packet system (EPS) mobility management (EMM) EMM-IDLE mode to an EMM-CONNECTED mode). Without the additional radio capability information, some features, such as handover to other frequency bands, may not work.

Furthermore, the current storage limit at the MME of 510 octets of radio capability information for each UE applies to the sum of all radio capability information about all 3GPP RATs supported by the UE, not just to the radio capability information that relates to E-UTRAN. Thus, even if the radio capability information relating to E-UTRAN requires less than 510 octets, the MME may not be able to store radio capability information relating to other RATs like GERAN, UTRAN, and unlicensed RATs such as IEEE 802.11 and Bluetooth. Consequently, inter-RAT handover or inter-RAT idle mode mobility to the other RATs may not work.

Another problem with the approach used by the current standard is that it requires a UE to provide all of the UE's radio capability information even though typical mobile networks only deploy a few frequency bands and only support a few carrier aggregation CA combinations and/or modes. In addition, a RAN for a mobile network, such as an E-UTRAN, may only support some features. In certain cases, the question of whether a UE supports a specific feature for a certain band may depend on whether the band at the RAN uses a time-division duplex (TDD) mode or a frequency-division duplex (FDD) mode; support for the specific feature may also depend on the mode of a target band to which handover or redirection is intended.

At best, the communication of a UE's capabilities, irrespective of the capabilities of a RAN, can result in inefficiency when unnecessary radio capability information is stored at an MME, excessive communication and battery usage at the UE, and additional strain on the mobile network. At worst, the MME can store unnecessary radio capability information in the 510 octets allotted for the UE and neglect to store helpful information that is contained in later octets that may not be stored when the UE's capability information is greater than 510 octets.

One temporary remedy might be to raise the limit of 510 octets per UE at the MME in the next 3GPP standard. However, 3GPP is defining new frequency bands and CA combinations at a very fast rate. As a result, a new limit might be quickly outgrown by the amount of radio capability information that will be available for a UE. Furthermore, raising the memory limit would not address the problem of inefficiency. Since the amount of radio capability information that is available is growing faster than the amount of radio capability information that is actually useful for any specific network, the percentage of storage space that is occupied by useful radio capability information could actually decrease as the storage limit increases.

Alternatively, the MME could be configured to store all radio capability information transferred by the UE without any limit at all. However, this would likely exacerbate the inefficiency issue. Furthermore, network vendors and operators would be unlikely to accept a standard without a limit of some kind, since they would likely be required to absorb the costs of using additional memory. An MME can serve several million subscribers, so storing 1000 additional octets of information for each subscriber's UE would require equipping the MME with several additional gigabytes of memory. As a result, network vendors and operators would likely implement proprietary limits, leading to less predictable performance and/or interoperability for UEs that are used in different network environments.

Another non-standardized approach involves configuring a UE to determine which bands are applicable to a geographical region where the UE is located. Up to release 10 of the 3GPP specifications, the number of frequency bands that can be signaled in the radio capability information about the UTRAN from the UE to a network is restricted to 16. To work around this restriction, a UE that supports more than 16 bands can be configured to determine, based on the geographical region (e.g., Europe, Asia, North or South America, Africa, Australia) in which the UE is situated, which bands are most likely to be used by networks in the UE's area. The UE can then send radio capability information relating to only those bands. This solution can be helpful in regions where no more than 16 bands are generally supported. In regions where more than 16 bands are supported, the UE may have programmed lists indexed by operator. These lists can include known (or potentially available) bands for each operator. However, these lists can rapidly become outdated.

There is, therefore, a need for a better solution to the problems that currently affect the transmittal and storage of radio capability information. Two novel solutions (method 1 and method 2) that are described in this application involve reducing the radio capability information before it is transmitted from the UE, while another solution (method 3) involves reducing the radio capability information after it has been received by the network.

Method 1

In method 1, a mobile network can provide a UE with additional information that allows the UE to exclude irrelevant radio capability information from the UE capability information message that the UE sends to the mobile network (e.g., as illustrated in FIG. 1). The additional information that the mobile network provides to the UE may be specific for a certain RAT and can include, but is not limited to, one or more of: the frequency bands supported in the mobile network; the maximum number of carriers that can be aggregated in the mobile network, possibly listed separately for downlink (DL) and uplink (UL); the modes supported on the mobile network (e.g., time-division duplexing (TDD) and frequency-division duplexing (FDD)); and a 3GPP release version up to which the UE should provide radio capability information (e.g., Rel. 8, 9, 10, 11, 12, 13, etc.). The mobile network can be configured to provide the additional information via dedicated signaling (e.g., in the UE Capability Enquiry Message shown in FIG.

1). The mobile network can also be configured to provide the additional information via a system information broadcast. Alternatively, the mobile network can also be configured to provide the additional information via a combination of dedicated signaling and a system information broadcast.

Method 1 can be implemented in many different ways. The following example is one illustrative way in which method 1 can be implemented, but is not intended to limit the scope of the technology nor to identify essential aspects of the technology.

According to 3GPP TS 36.331, subclause 6.2.2, a UE capability enquiry message contains a ue-CapabilityRequest parameter defined as a "list of the RATs for which the UE is requested to transfer the UE radio access capabilities i.e. E-UTRA, UTRA, GERAN-CS, GERAN-PS, CDMA2000."

In one example, an eNB can be configured to add one or more optional parameters to the UE capability enquiry message (e.g., as illustrated in FIG. 1). A first optional parameter can indicate the frequency bands supported by the mobile network. A UE that receives the first optional parameter in the UE capability enquiry message can elect not to send UE radio capability information that regards unsupported frequency bands to the network. A frequency band can be considered "supported by the network" if the frequency band is supported anywhere in the network, not just if it is supported by the eNB and its neighboring cells.

The information related to the frequency bands supported by the mobile network can be made available to the eNB via administration or via signaling if the mobile network is a self-organizing network (SON). In some embodiments, the first optional parameter can indicate the frequency bands supported by equivalent public land mobile networks (PLMNs). Equivalent PLMNs are considered equivalent to each other for the purposes of PLMN selection, cell selection/reselection, and handover.

In some embodiments, the first optional parameter can be encoded as an explicit list of numbers of the supported frequency bands. Alternatively, the first optional parameter can be encoded as a bitmap. In one example, the bitmap can be 256 bits long. Each bit position can correspond to a certain frequency band. If desired, the bitmap can also have a flexible length so that the UE will not be required to encode the last bits if they do not include any bit that is set to 1. Such a flexible-length bitmap can be extended in the future if additional bands are defined by 3GPP. Alternatively, the mobile network can be configured to use either encoding format for the first optional parameter depending on which format would use fewer bits.

A second optional parameter can comprise information used to indicate (1) the maximum number of downlink (DL) carriers the mobile network can support for carrier aggregation; (2) a maximum number of uplink carriers the mobile network can support for carrier aggregation; and (3) support of carrier aggregation bandwidth classes (e.g., A, B, C), particularly for UL. With the information indicated by the information that comprises the second parameter, a UE may be able to avoid sending radio capability information regarding multiple timing advance (MTA) support. In one example, the mobile network may indicate a value ranging from 1 to 8 (or more) for the DL, where the value represents the maximum number of carriers that can be aggregated relative to what the mobile network supports. A value of two, for example, can indicate that the UE does not need to send any radio capability information relating to band combinations used for aggregation of more than two carriers.

The second optional parameter can alternatively comprise information that can be used to indicate maximum numbers of DL carriers and UL carriers for intra-band and inter-band combinations separately. The second optional parameter can also comprise information that can be used to indicate a maximum number of DL carriers and a maximum number of UL carriers if DL and UL carrier aggregation is simultaneously supported.

The second optional parameter can also comprise information that can be used to indicate whether there is support for transmission modes TM9 and TM10. A UE that receives this information can avoid sending radio capability information that regards special multiple-input multiple-output (MIMO) and coordinated multipoint (coMP) settings for TM9 or TM10 if TM9 or TM10 are not supported. The second optional parameter can also comprise information that can be used to indicate whether UL MIMO is supported. A UE that receives this information can avoid sending radio capability information that regards UL MIMO if UL MIMO is not supported.

A third optional parameter can comprise information used to indicate whether the mobile network (or its equivalent PLMNs) supports multiple modes (e.g., duplexing modes FDD or TDD). A UE that receives this information can avoid sending radio capability information that regards a mode that is not supported.

A fourth optional parameter can comprise information used to indicate a 3GPP release version x. A UE that receives this information can be configured to send radio capability information regarding release version x and any previous release versions. In this way, even if the UE is compliant with later release versions of 3GPP, the UE need not send radio capability information regarding those later release versions if they are not supported by the network.

While the parameters discussed above may be included in a UE capability enquiry message (e.g., as illustrated in FIG. 1), the information that can be included in these parameters can also be broadcasted as an enhancement to an existing system information broadcast (SIB) message or another message. Furthermore, the same information can also be provided by the mobile network via other radio interfaces (e.g., the UTRAN radio interface) if the UE needs to provide its E-UTRAN radio capability in preparation for an inter-RAT handover from a UTRAN to an E-UTRAN.

Figure 3:
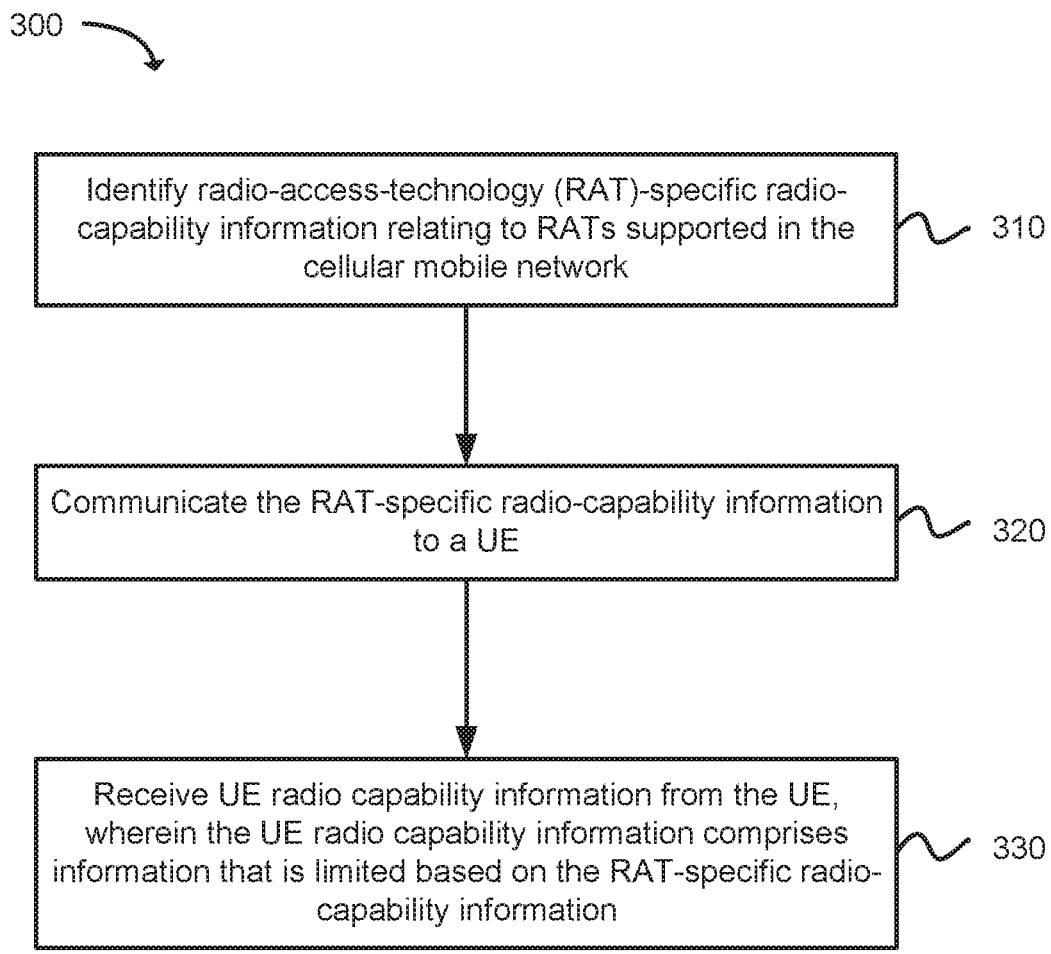
FIG. 3 illustrates an example of a sequence of operations that circuitry in at network node in a cellular mobile network can be configured to perform.

FIG. 3 depicts an illustrative example of a sequence of operations that circuitry (e.g., one or more processors) at a network node in a mobile network can be configured to perform. The term "network node" refers to an active electronic device that is attached to a network and is capable of sending, receiving, and/or forwarding information over a communications channel (e.g., an evolved node B (eNB), a mobility management entity (MME), or a policy charging and rules function (PCRF) node). As in 310, circuitry at the network node may be configured to identify radio-access-technology (RAT)-specific radio-capability information relating to RATs supported in the cellular mobile network (e.g., an E-UTRAN). In some embodiments, the RAT-specific radio-capability information may comprise information regarding a plurality of supported frequency bands supported in the cellular mobile network. In some embodiments, the RAT-specific radio-capability information may also comprise information regarding a maximum number of carriers for UL or DL that can be aggregated in the cellular mobile network. Additionally, the RAT-specific radio-capability information may comprise information regarding a plurality of modes supported by the in the cellular mobile network (e.g., a time-division duplex (TDD) mode or a frequency-division duplex (FDD) mode). The RAT-specific radio-capability information may also comprise information regarding a 3GPP release version up to which the UE is to provide radio capability information.

As in 320, circuitry at the network node may be configured to communicate the RAT-specific radio-capability information to a UE. In some embodiments, the RAT-specific radio-capability information may be broadcast as system information to the UE. In addition, the circuitry may be configured to: receive a request to establish a radio resource control (RRC) connection from the UE at an evolved node B (eNB) in the cellular mobile network; receive a request to set up user plane bearers for the UE from a mobility management entity (MME) in the cellular mobile network; and communicate the RAT-specific radio-capability information in a UE-capability-enquiry message to the UE if the request received from the MME does not include UE radio capability information. The request can include UE radio capability information. As in 330, circuitry at the network node may be configured to receive UE radio capability information from the UE comprising information that is selected (e.g., by the UE) based on the RAT-specific radio capability information.

Figure 4:
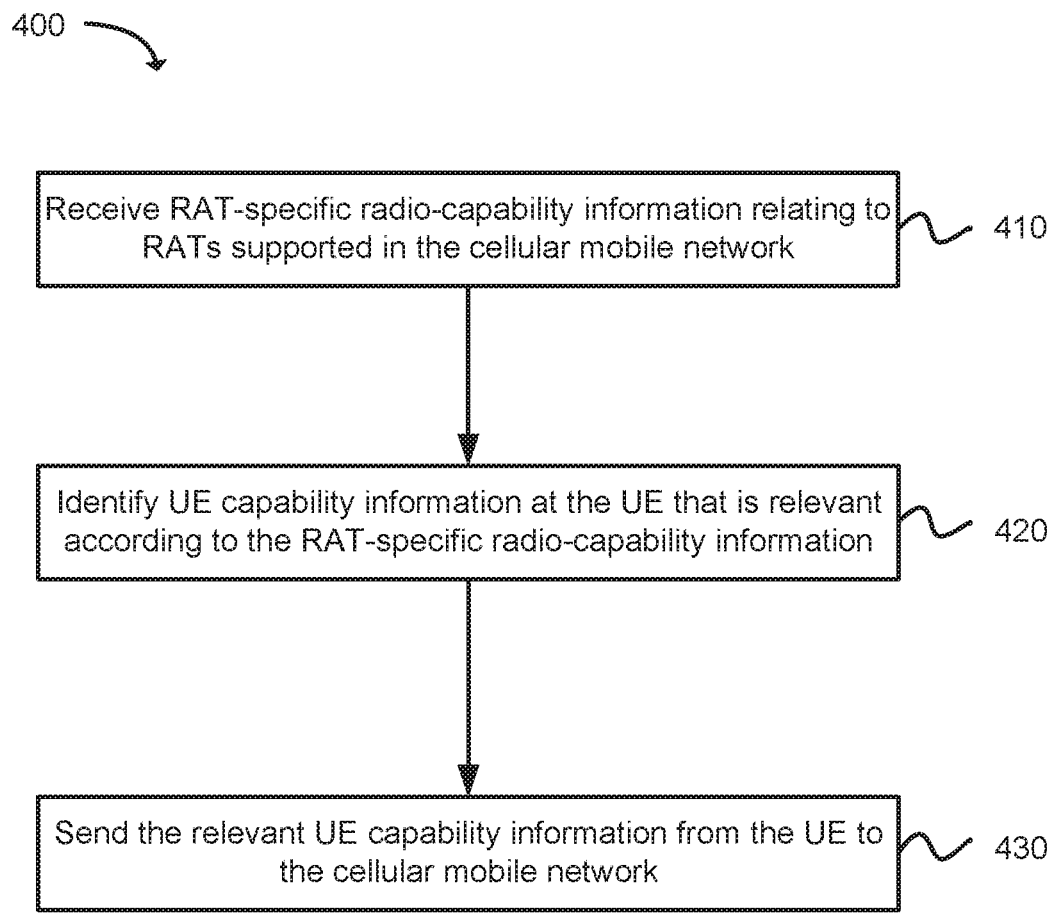
FIG. 4 illustrates an example of a sequence of operations that circuitry at a UE can be configured to perform.

FIG. 4 depicts an illustrative example of a sequence of operations that circuitry (e.g., one or more processors) at a UE can be configured to perform. As in 410, the circuitry at the UE can be configured to receive RAT-specific radio-capability information relating to RATs supported in a cellular mobile network (e.g., an E-UTRAN). In some embodiments, the RAT-specific radio-capability information may comprise information regarding a plurality of supported frequency bands supported in the cellular mobile network. In some embodiments, the RAT-specific radio-capability information may also comprise information regarding a maximum number of carriers for UL or DL that can be aggregated in the cellular mobile network. Additionally, the RAT-specific radio-capability information may comprise information regarding a plurality of modes supported by the in the cellular mobile network (e.g., a time-division duplex (TDD) mode or a frequency-division duplex (FDD) mode). The RAT-specific radio-capability information may also comprise information regarding a 3GPP release version up to which the UE is to provide radio capability information. The RAT-specific radio-capability information can also be received in a UE-capability-enquiry message or in a system information broadcast.

As in 420, the circuitry at the UE can be configured to identify UE capability information at the UE that is relevant according to the RAT-specific radio-capability information. In general, UE capability information that regards capabilities that are supported by the cellular mobile network can be considered relevant. As in 430, the circuitry at the UE can be configured to send the relevant UE capability information from the UE to the cellular mobile network.

Method 2

In method 2, a UE can adaptively select a set of frequency bands for which to transmit radio capability information based on the UE's history in a wireless network. For example, the UE may have programmed lists of supported frequency bands and/or frequency-band combinations indexed by operator. Alternatively, the UE may begin with empty lists or lists that comprise an operator-independent set of bands and/or band combinations that are commonly supported. When the UE receives a request to provide the UE's radio capability information, the UE can add one or more additional bands and/or band combinations to the list and include it when radio capability information is sent to the requesting mobile network (or other mobile networks associated with the same operator). If any bands and/or band combinations that are on the list are not assigned by the network for a long period of time, those bands and/or band combinations can be removed from the list that corresponds to the operator. In this way, the UE can adaptively learn not to send irrelevant radio capability information to mobile networks.

Figure 5:
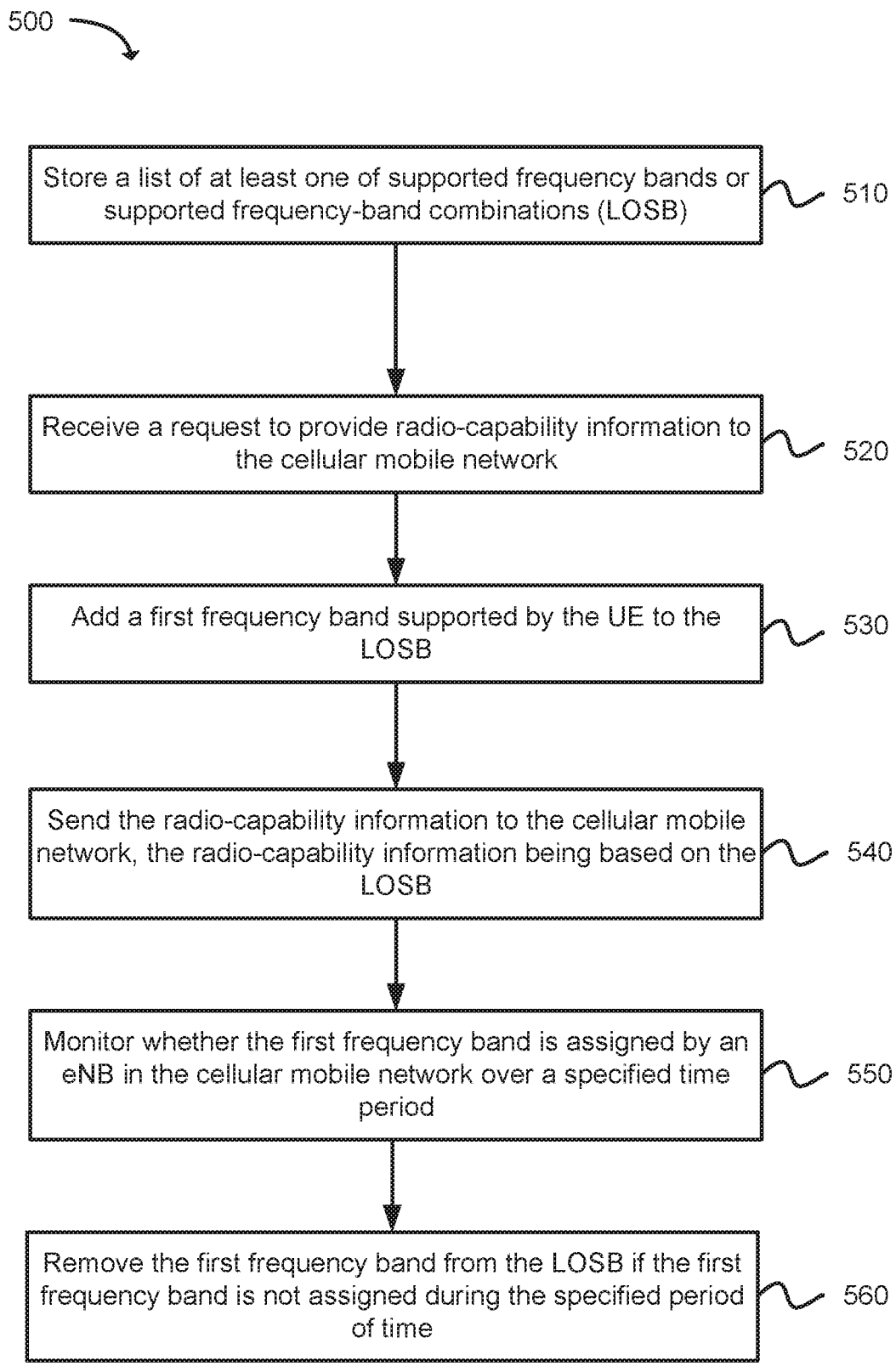
FIG. 5 illustrates an example of a sequence of operations that circuitry at a UE can be configured to perform.

FIG. 5 depicts an illustrative example of a sequence of operations that circuitry (e.g., one or more processors) at a UE can be configured to perform. As in 510, the circuitry can be configured to store a list of supported frequency bands and/or supported frequency-band combinations (LOSB). In some embodiments, the circuitry can also be configured to store a set of LOSBs. One or more LOSBs in the set of LOSBs can correspond to one or more of: an operator, a country, a geographical region, or a continent.

As in 520, the circuitry can be configured to receive a request to provide radio-capability information to the cellular mobile network. As in 530, the circuitry can also be configured to add a first frequency band supported by the UE to the LOSB. As in 540, the circuitry can also be configured to send the radio-capability information to the cellular mobile network. The radio-capability information may be based on the LOSB (e.g., comprise information regarding capabilities included in the LOSB). As in 550, the circuitry can also be configured to monitor whether the first frequency band is assigned by an eNB in the cellular mobile network during a specified time period. As in 560, the circuitry can also be configured to remove the first frequency band from the LOSB if the first frequency band is not assigned during the specified period of time. In some embodiments, the LOSB can include an operator-independent set of frequency bands and frequency-band combinations before any frequency bands are added to or deleted from the LOSB.

Method 3

In method 3, a network node (e.g., an eNB or an MME) can receive radio capability information regarding a UE and store only the portions of the UE radio capability information that are relevant to capabilities supported in the network (e.g., by any nodes in the network). In other words, the network node filters or prunes the UE radio capability information until only relevant information remains. If the network node is a serving eNB and is forwarding the UE radio capability information to a target eNB during a handover, the target eNB may support more bands and/or band combinations than the serving eNB. As a result, in some embodiments, the eNB can be configured to store portions of the UE radio capability information that are relevant to capabilities supported by neighboring nodes.

In one non-limiting example, a network node applying method 3 may be configured to work in one of two pruning modes. In both pruning mode 1 and pruning mode 2, the network node can be configured to remove any UE radio capability information that the network node can decode, but that is related to a capability not supported by the mobile network. In pruning mode 1, the network node can also be configured to remove any UE radio capability information that the network node cannot decode (e.g., because it was added in a later protocol version not supported by the network node). In pruning mode 2, by contrast, the network node can also be configured to not remove any UE radio capability information that the network node cannot decode. Mode 2 can be used in situations where different nodes in the mobile network have different capabilities (e.g., when the mobile network is being updated and different nodes are supporting different protocol versions).

Figure 6:
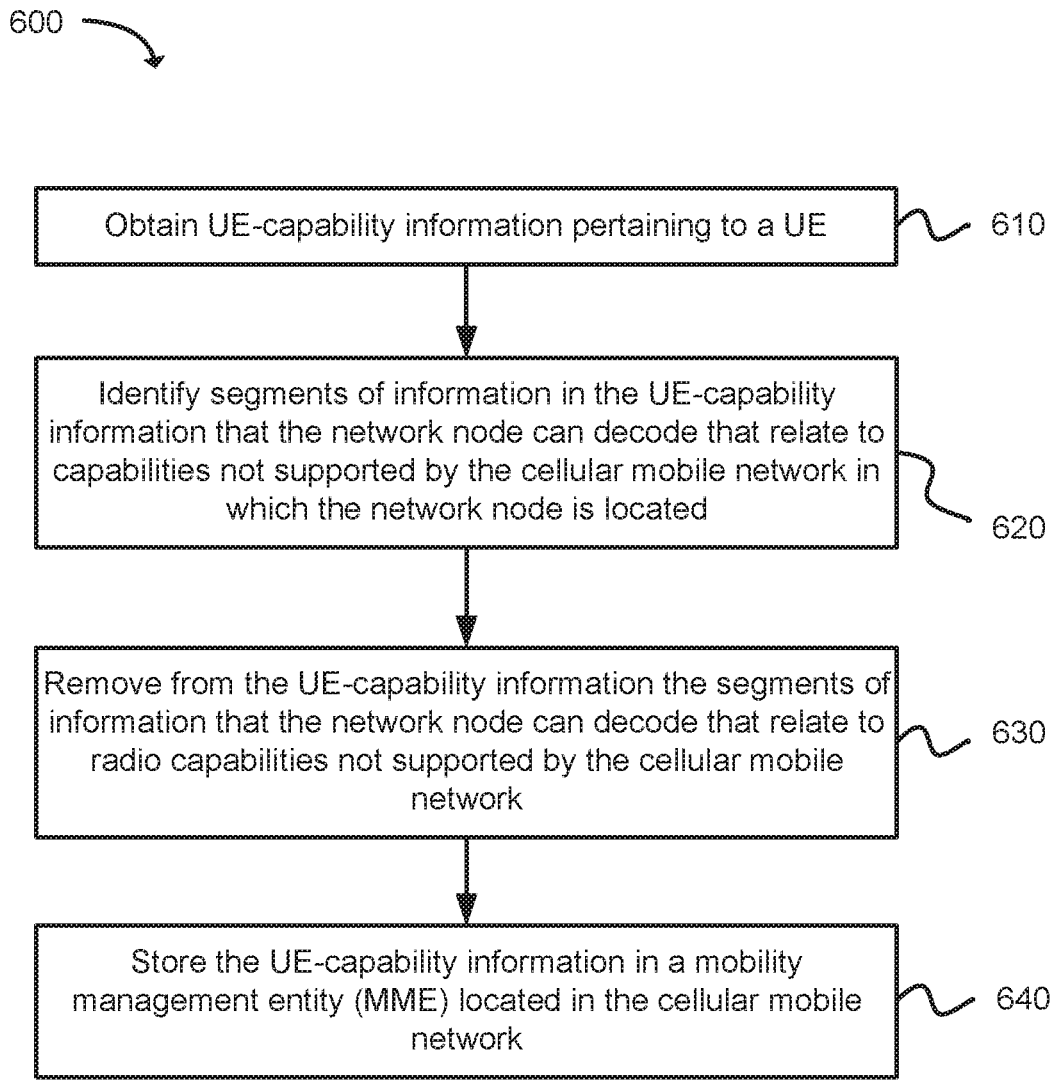
FIG. 6 illustrates an example of a sequence of operations that circuitry at a network node in a cellular mobile network can be configured to perform.

FIG. 6 depicts an illustrative example of a sequence of operations that circuitry (e.g., one or more processors) at a network node in a cellular mobile network can be configured to perform. As in 610, the circuitry can be configured to obtain UE-capability information pertaining to a UE. In some embodiments, the network node may be an eNB or an MME. In embodiments where the network node is an eNB, for example, the UE-capability information may be received via transmission from the UE or via a connection to an MME on which the UE-capability information is stored. As in 620, the circuitry can be configured to identify segments of information in the UE-capability information that the network node can decode that relate to capabilities not supported by the cellular mobile network in which the network node is located. As in 630, the circuitry can be configured to remove from the UE-capability information the segments of information that the network node can decode that relate to radio capabilities not supported by the cellular mobile network. As in 640, the circuitry can be configured to store the UE-capability information in a mobility management entity (MME) located in the cellular mobile network. In some embodiments, the circuitry can be configured to identify and remove segments of information in the UE-capability information that the network node cannot decode.

Figure 7:
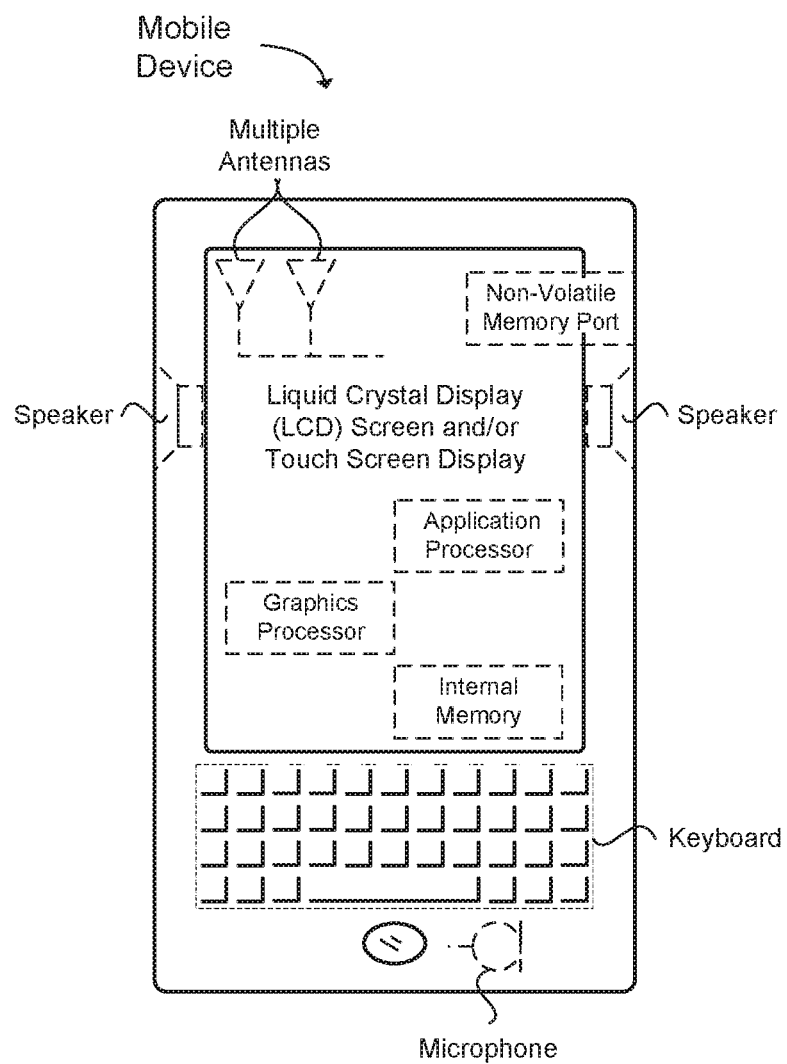
FIG. 7 illustrates a functional block diagram of a wireless communication device in accordance with some embodiments.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as defacto equivalents of one another, but are to be considered as separate and autonomous.

Furthermore, the described features, structures, or characteristics may be combined in any suitable manner in one or more embodiments. In the following description, numerous specific details are provided, such as examples of layouts, distances, network examples, etc., to provide a thorough understanding of some embodiments. One skilled in the relevant art will recognize, however, that the claimed subject matter can be practiced without one or more of the specific details, or with other methods, components, layouts, etc. In other instances, well-known structures, materials, or operations are not shown or described in detail to avoid obscuring aspects of the claimed subject matter.

While the forgoing examples are illustrative of the principles of the present claimed subject matter in one or more particular applications, it will be apparent to those of ordinary skill in the art that numerous modifications in form, usage and details of implementation can be made without the exercise of inventive faculty, and without departing from the principles and concepts of the claimed subject matter. Accordingly, it is not intended that the claimed subject matter be limited, except as by the claims set forth below.

What is claimed is:

1. An apparatus of a user equipment (UE) operable to communicate radio access capability information, the apparatus comprising:
   memory; and
   one or more processors configured to:
   decode, at the UE, a UE capability enquiry message received from a network, the UE capability enquiry message including a list of frequency bands that are supported in the network, and a maximum number of uplink carriers supported in the network;
   create, at the UE, a list of frequency band combinations that are supported at the UE based in part on the UE capability enquiry message, wherein a number of carriers in an uplink for the frequency band combination does not exceed the maximum number of uplink carriers supported in the network; and
   encode at the UE, a UE capability information message for transmission to the network that includes the list of frequency band combinations that are supported at the UE and the network.

2. The apparatus of claim 1, further comprising a transceiver configured to:
   receive the UE capability enquiry message from the network; and
   transmit the UE capability information message to the network.

3. The apparatus of claim 1, wherein the UE capability enquiry message further includes a maximum number of downlink carriers supported in the network.

4. The apparatus of claim 3, wherein a number of carriers in a downlink for a frequency band combination in the list of frequency band combinations does not exceed the maximum number of downlink carriers supported in the network.

5. The apparatus of claim 1, wherein the list of frequency band combinations are limited to the list of frequency bands that are supported in the network.

6. The apparatus of claim 1, wherein the frequency band combinations that are included in the UE capability information message are carrier aggregation (CA) band combinations.

7. The apparatus of claim 1, wherein the UE capability enquiry message is received at the UE via a radio resource control (RRC) signaling message.

8. The apparatus of claim 1, wherein the UE capability enquiry message is received at the UE when the UE is in a connected mode.

9. At least one non-transitory machine readable storage medium having instructions embodied thereon for a network node in a network to determine radio access capability information associated with a user equipment (UE), the instructions when executed by one or more processors cause the UE to perform the following:
   identifying, at the network node, a list of frequency bands that are supported in the network;
   encoding, at the network node, a UE capability enquiry message for transmission to the UE that includes the list of frequency bands that are supported in the network, a maximum number of downlink carriers supported in the network, and a maximum number of uplink carriers supported in the network; and
   decoding, at the network node, a UE capability information message received from the UE that includes a list of frequency band combinations that are supported at the UE and the network, wherein a number of carriers in a downlink for a frequency band combination in the list of frequency band combinations does not exceed the maximum number of downlink carriers supported in the network, and a number of carriers in an uplink for the frequency band combination does not exceed the maximum number of uplink carriers supported in the network.

10. The at least one non-transitory machine readable storage medium of claim 9, wherein the list of frequency band combinations are limited to the list of frequency bands that are supported in the network.

11. The at least one non-transitory machine readable storage medium of claim 9, wherein the frequency band combinations that are included in the UE capability information message are carrier aggregation (CA) band combinations.

12. The at least one non-transitory machine readable storage medium of claim 9, wherein the UE capability enquiry message is transmitted to the UE via a radio resource control (RRC) signaling message.

13. The at least one non-transitory machine readable storage medium of claim 9, wherein the network that includes the network node is an evolved universal terrestrial radio access network (E-UTRAN).

14. An apparatus of a user equipment (UE) that is operable to communicate radio access capability information from a user equipment (UE) to a network node, the apparatus comprising:
   memory; and one or more processors configured to:
- decode, at the UE, a UE capability enquiry message received from a network, the UE capability enquiry message including a list of frequency bands that are supported in the network, and a maximum number of uplink carriers supported in the network;
- create, at the UE, a list of frequency band combinations that are supported at the UE based in part on the UE capability enquiry message, wherein, and a number of carriers in an uplink for the frequency band combination does not exceed the maximum number of uplink carriers supported in the network; and
- encode at the UE, a UE capability information message for transmission to the network that includes the list of frequency band combinations that are supported at the UE and the network.

15. The apparatus of claim 14, wherein the list of frequency band combinations are limited to the list of frequency bands that are supported in the network.

16. The apparatus of claim 14, wherein the frequency band combinations that are included in the UE capability information message are carrier aggregation (CA) band combinations.

17. The apparatus of claim 14, wherein the UE capability enquiry message is received at the UE via a radio resource control (RRC) signaling message.

18. The apparatus of claim 14, wherein the UE capability enquiry message is received at the UE when the UE is in a connected mode.

19. The apparatus of claim 14, wherein the UE capability enquiry message further includes a maximum number of downlink carriers supported in the network.

20. The apparatus of claim 19, wherein a number of carriers in a downlink for a frequency band combination in the list of frequency band combinations does not exceed the maximum number of downlink carriers supported in the network.

* * * * *